United States Patent [19]

Hammond

[11] 4,350,734
[45] Sep. 21, 1982

[54] INTEGRAL COMPOSITE FOAM PRODUCT AND METHOD

[75] Inventor: James A. Hammond, Redlands, Calif.

[73] Assignee: Colamco, Inc., Columbus, Ohio

[21] Appl. No.: 199,996

[22] Filed: Oct. 23, 1980

[51] Int. Cl.³ .............................................. B32B 3/26
[52] U.S. Cl. ............................. 428/308.4; 428/309.9; 428/316.6; 428/318.6; 428/319.3
[58] Field of Search ............ 428/315, 311, 310, 306.6, 428/308.4, 309.9, 311.1, 311.7, 316.6, 318.4, 318.6, 318.8, 319.3, 322.7, 423.3

[56] References Cited

U.S. PATENT DOCUMENTS

| | | | |
|---|---|---|---|
| 3,256,131 | 6/1966 | Koch et al. | 428/310 |
| 3,264,166 | 8/1966 | Lowery | 428/315 |
| 3,437,551 | 4/1969 | Marshack | 428/308.4 |
| 3,503,822 | 3/1970 | Turkewitsch | 428/311 |
| 3,794,548 | 2/1974 | Wirth et al. | 428/315 |
| 3,873,407 | 3/1975 | Kumata et al. | 428/315 |
| 3,887,735 | 6/1975 | Laberinti | 428/315 |
| 3,922,429 | 11/1975 | Welch et al. | 428/315 |
| 3,941,633 | 3/1976 | Wang et al. | 428/318.6 |
| 4,084,030 | 4/1978 | Goodale et al. | 428/308.4 |
| 4,132,825 | 1/1979 | Hahn | 428/315 |

FOREIGN PATENT DOCUMENTS

| | | | |
|---|---|---|---|
| 625933 | 1/1963 | Belgium | 428/317.9 |
| 1362035 | 4/1964 | France | 428/316.6 |

Primary Examiner—William J. Van Balen
Attorney, Agent, or Firm—Blakely, Sokoloff, Taylor & Zafman

[57] ABSTRACT

The invention is directed to a rigid article comprising a soft foam member, preferably open cell polyurethane, adhered to at least one surface of said soft foam member, a hard polyurethane resin member; said adhesion being obtained by way of penetration of hard resin affording material into cells of said soft foam member for a distance sufficient to provide a substantially permanent bond between said two members, after curing said hard resin-affording material; and said hard resin member is sufficiently thick to provide configurational support for said article. Normally, the article includes a cover member.

13 Claims, 5 Drawing Figures

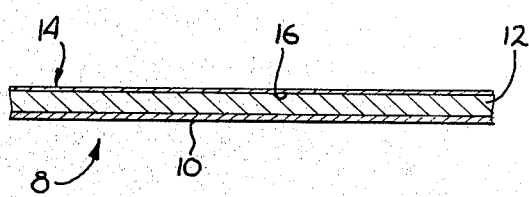
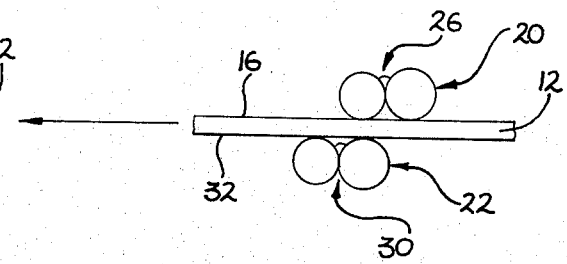
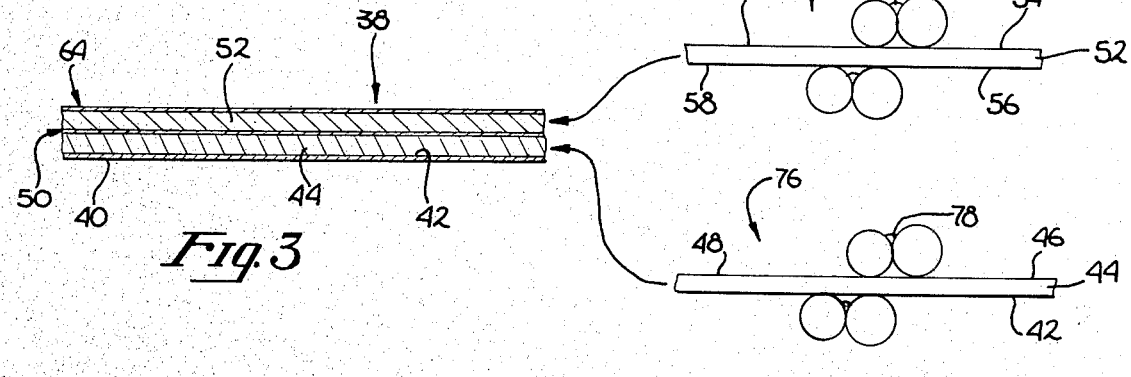
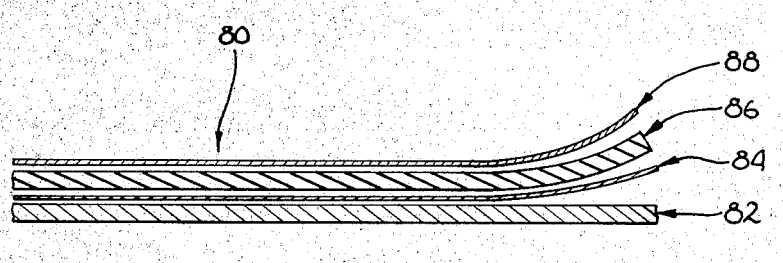

INTEGRAL COMPOSITE FOAM PRODUCT AND METHOD

BACKGROUND OF THE INVENTION

1. Field of the Invention

This invention relates to plastic laminates and to a method of making such laminates. Particularly the invention relates to shaped articles, either flat or 3-D. More particularly the invention relates to integral or unitary laminates and preferably to those made from polyurethane.

2. Description of the Prior Art

Plastic laminates (composites) of two or more layers of material, especially those including a layer of soft foam (flexible, compressible) material, are well known. For many uses, it is necessary that the laminate have a more or less rigid configuration. For example, a motor cycle seat or the cushion back of a chair or automobile seat. These rigid articles are conventionally made by attaching a rigid backing material to the plastic laminate, such as: plywood, paper board, paper box sheeting, or some sort of plastic sheeting.

The rigid backing is difficult to apply in the case of many 3-D articles. Also these rigid backings are not always "permanently" adhered and come loose or come off in use. Also these rigid backings are costly in materials and in production labor.

The primary object of this invention is a rigid plastic laminate wherein the rigid plastic backing member (substrate) is integrally adhered to a soft foam filler member which in turn is adhered to a cover member (superstrate) to form an integral (unitary) rigid laminated article, either flat or 3-D, thereby avoiding the problems associated with the non-integral rigid backing of the prior art. Other objects will be apparent from the description of the invention.

U.S. patents of interest to the invention are:

| Number | Granted |
| --- | --- |
| 3,256,131 | June, 1966 |
| 3,264,166 | August, 1966 |
| 3,503,822 | March, 1970 |
| 3,903,919 | January, 1976 |
| 3,941,633 | March, 1976 |

SUMMARY OF THE INVENTION

The invention is directed to an article, preferably a polyurethane article, comprised of a soft foam member; adhered to at least one surface of the soft foam member, a hard polyurethane resin member; the adhesion is obtained by way of penetration of the hard resin affording material into cells of the soft foam member for a distance sufficient to provide a substantially permanent bond between the two members, after curing the hard resin affording material; and the hard resin member is sufficiently thick to provide configurational support for the article, that is, provide a substantially rigid article. Desirably the article includes a cover member adhered to at least one free surface. The cover material is preferably a vinyl polymer or a textile fabric. Desirably the cover member is adhered by a soft polyurethane resin adhesive positioned on the surface of the soft foam member to be covered.

Also the invention is directed to an article comprised of a barrier layer member adherently positioned between two soft foam filler members; one of said soft foam filler members having an integrally bonded hard polyurethane member, as above. The free surface of the other soft foam filler member is desirably covered, preferably using a soft polyurethane resin adhesive.

Also the invention is directed to an article comprised of a soft foam member; a barrier layer adherently positioned on one surface of said soft foam member; a hard polyurethane resin member adhered to another side of said barrier layer, thick enough to provide configurational support for said article. Preferably a cover member is adhered to the free side of said soft foam filler member.

Also the invention is directed to a method of making an article which method comprises coating a polyurethane formulation affording, on curing, a hard resin, onto at least one surface of an open cell, soft foam member, which formulation is viscous enough to control penetration into said soft foam cells not more than about a distance sufficient to provide a substantially permanent bond between the cured hard resin product and the soft foam member; the formulation is coated on the soft foam member in an amount so as to provide after curing configuration support for the article; and curing said coating to obtain an article of the desired configuration. Desirably the method includes positioning a cover member on at least one free surface of the soft foam member prior to said curing step. Preferably the cover member is adhered to said soft foam member by coating said soft foam member with an adhesive prior to emplacement of said cover and desirably said adhesive material is a soft polyurethane resin-affording composition. Preferably the soft foam filler member is an open cell polurethane.

BRIEF DESCRIPTION OF THE DRAWINGS

FIG. 1 illustrates an embodiment composed of a hard polyurethane substrate adhered to a soft foam filler, and a cover member adhered to the soft foam by a soft polyurethane resin.

FIG. 2 illustrates one procedure using rolls to apply the polyurethane formulation which provides the hard resin substrate, after curing, to one surface of the soft foam filler, and for applying the adhesive composition, which cures to a soft polyurethane resin, to the surface of the soft foam which receives the cover member—prior to the cure.

FIG. 3 illustrates another embodiment composed of two soft foam members separated by and adhered to a barrier layer member; a hard polyurethane resin substrate adhered to a free surface of said soft foam member; a soft polyurethan resin adhered to a free surface of the other soft foam member, and a cover member adhered by said soft resin.

FIG. 4 illustrates a roll application procedure for applying hard resin formulation to two opposite sides of a soft foam filler member; and for applying soft resin composition to two opposite sides of another soft foam member. Then a barrier layer is positioned between the two coated soft foam members; and a cover member is positioned on the other coated surface of the other soft foam member.

FIG. 5 illustrates a further embodiment of an article of the invention, with one end "exploded" for convenience in explanation. A hard resin substrate (backing) is separated by a barrier layer—to prevent penetration of hard resin formulation into the soft foam filler member—from the soft foam filler member; and a cover member (material) is positioned on the opposite side of said soft foam member. If needed, adhesive is applied to the cover-surface and/or the barrier layer-surface of the soft foam filler member.

DESCRIPTION OF PREFERRED EMBODIMENTS

In the drawings, only one work station is illustrated, namely, roll coating of hard resin formulation and soft resin composition onto a surface(s) of soft foam filler sheeting. Other procedures can be used to coat the resin onto the soft foam sheeting, such as, casting, brushing, knife, curtain, or spray.

Because the mechanical procedures of making the rigid article of the invention are pretty much conventional, stations beyond the soft foam filler coating station, such as, adhesive application, if any; cover member application, if any; barrier layer insertion, if any, heating and curing, have been omitted. The earlier listed U.S. patents illustrate conventional methods application herein; these patents are incorporated herein by reference.

FIG. 1 illustrates one embodiment 8 of the rigid article of the invention, which has a rigid (hard) polyurethane resin substrate (backing) member 10 integrally adhered to a soft foam filler member 12 and a cover member 14 adhered to the free surface 16 of the soft foam member 12.

The hard polyurethane resin is obtained by curing a polyurethane affording formulation (material) capable of penetrating into the cellular structure of soft foam member 12 a distance sufficient to provide a permanent bond between the hard resin member and the soft foam member. The cure causes the penetrated formulation to harden in the penetrated cells and locking the soft foam member to the hard resin substrate member in an integral permanent bond.

The integral hard resin substrate member 10 is sufficiently thick to provide rigid configurational support for the article. The "rigidity" is a function of the utility requirements of the article. For example, a complex 3-D motorcycle seat needs to be rigid enough to support 1-2 riders in an atmospheric exposed mount; an automobile seat back can tolerate considerable flexibility; a flat article may need flexibility to permit rolled-up storage capability. The necessary thickness of the hard resin member may in some instances require a number of coats of hard resin formulation to be applied seriatim.

The common knowledge of the art eliminates the need to go into detail on the polyurethane formulations which are capable of producing desired rigid (hard) resin after curing. The hard resin may be solid or foamed. Weight considerations make the foamed hard resin the preferred substrate.

The soft foam filler member 12 may be any plastic foam which permits the necessary interpenetration to form the integral permanent bond. An open cell filler and particularly an open cell polyurethane filler is preferred. Dependent on the intended utility of the article, the filler member 12 may vary in thickness from just appreciable to several inches. A standing mat may need a thickness of ¼ to 1 inch; a sofa cushion may be 3-4 inches thick.

The soft foam filler member 12 may be formed from any suitable polymer; such as: styrene, vinyl and preferably urethane polymers.

The cover member 14 is positioned on free surface 16 of soft foam filler member 12. The cover member 14 may be self-adherent to free surface 16 bonding during curing of the article; or a separate adhesive coating, not shown, may be applied to free surface 16 before cover member 14 is positioned thereon to form a bonding layer on curing.

It is to be understood that herein "free surface" is a surface which is not adhered to said hard resin member or covered by a barrier layer member and is free to accept adhesive and/or a cover member.

The cover member 14 may be made of any suitable material. Preferably the cover member is made of plastic, such as: vinyl polymer, polyurethane film or polyolefin film; or is made of textile fabric, either woven or non-woven, such as: cotton, nylon, polyester or polyolefin. More preferably, the plastic cover member is flexible.

A plastic cover member may be impressed or embossed during the curing procedure with a pattern, which may be carried by a pattern roll or by a flat press. Such patterns are illustrated in U.S. Pat. No. 2,256,131.

It is to be understood that for some uses, the article may consist merely of hard resin substrate member 10 and soft foam member 12. The free surface 16 may be good enough for a particular use, or a separate, non-adhered cover member may be provided.

FIG. 2 shows soft foam filler member 12 passing between upper rolls 20 and lower rolls 22. Upper rolls 20 apply soft resin adhesive 26 to the free surface 16 of soft foam member 12. Lower rolls 22 apply hard resin formulation 30 to the surface 32 of soft foam member 12.

Hard resin formulation 30 may be applied as is, or it may be diluted before application. Dilution may be with conventional solvents. For example, aromatic hydrocarbons, such as: toluene, or alkylene chlorides, such as, methylene chloride and ethylene dichloride. Dilution may range widely, such as, 10% to 2000%, typically 70-80% and 500-1500%, based on hard resin as weight parts of solvent per 100 weight parts of hard resin. The amount of diluent present is determined by the particular formulation and the amount of penetration desired for the particular soft foam filler. The lower the viscosity of the diluted formulation, the deeper the penetration on curing. The very viscous formulations are difficult to apply and may give less bonding between the soft foam filler and the hard resin substrate. This effect is also evident in adhesive bonding of soft foam filler and cover member.

The adhesive may be any one suitable for the combination of cover material and soft foam filler. The hard resin may be used as adhesive when the soft foam is a polyurethane material, with the hard resin used in a viscous, slow flowing, formulation in order to keep interpenetration to a minimum.

FIG. 3 illustrates another embodiment 38 of the invention utilizing two soft foam filler members. A hard resin substrate 40 is integrally adhered to a surface 42 of soft foam member 44, as defined in connection with the embodiment 8 (FIG. 1). Embodiment 38 includes an adhesive coating 48, made of hard resin, on the free surface 46 of soft foam member 44 (FIG. 4). A barrier layer 50 is adherently positioned on adhesive coating 48. Barrier layer 50 bars penetration of hard resin 48 into the second soft foam filler member 52. Barrier layer 50 may be a sheet of newsprint (printed or plain web), kraft paper web, polymer film, rubber film, or plastic cover material. The barrier layer must be strong and durable enough to withstand cure conditions. Second soft foam filler member 52 is preferably of the same composition as soft foam filler member 44. Soft foam member 52 has an adhesive coating applied to upper surface 54 and to lower surface 56. Lower surface 56 adhesive coating 58 adheres the barrier layer 50 to the second soft foam member 52. Upper surface adhesive coating 62 adheres cover member 64 to the upper surface 54 of second soft foam member 52.

It is preferred that the adhesive 68 be a urethane composition which affords on curing a soft resin which does not impair the softness or flexibility of the soft foam member. Preferably the same adhesive is applied to both surfaces of member 52.

FIG. 4 shows a double roll procedure 72 (soft resin coater) for applying adhesive 68 to surfaces 54 and 56 of soft foam member 52. Double roll procedure 76 (hard resin coater) applies hard resin 78 to both surfaces of soft foam member 44. It is self-evident that the thickness of the two coatings will be adjusted to suit the purpose of each coating. Different hard resin formulations may be used on each surface.

FIG. 5 illustrates another embodiment 80 of the invention, showing one end exploded for clarity. A rigid backing 82 is adhered to a barrier layer 84. Barrier layer 84 is adhered to a soft foam filler member 86. Soft foam filler member 86 is adhered to cover material 88. On curing an integral, unitary article 80 is obtained. The use of barrier layer 84 enables a greater variety of hard resin formulations to be employed without impairing the flexibility of the soft foam member by deep penetration of hard resin.

A further embodiment comprises a thick soft foam member with hard resin positioned on three surfaces of the soft foam member (if desired a portion of the 4th surface may be coated) to a thickness providing a rigid article which retains some ability to compress when weight is applied to one of the coated surfaces. This embodiment is applicable to a sturdy seat base. It is to be understood this construction of soft foam member and hard resin may be also applicable to a one surface coating of hard resin, a two surface coating of hard resin, or any combination of complete surface coating(s) and partially coated surface(s).

It is to be understood that the invention includes articles which have a conventional reinforcing (backing) material adhered to the free surface of the hard resin rigid member. For example, the conventional material may be burlap, netting, heavy paper, nonwoven fabric, fiberglas, metal screen, or thin plywood.

EXAMPLES OF RESINS

1. Hard Resin Formulations

Each of the following formulations contains a number of commercially available components needed to obtain a polyurethane-affording formulation, upon curing each formulation provides a suitable hard resin for the invention.

The components which need definition are (each of the following names is a trade mark appellation):

GP 700: Low molecular weight poly(oxypropylene) triol, hydroxyl number approximately 700, made by Carpenter Chemical Company, Richmond, Va.

BE 375: Low molecular weight poly(oxypropylene) triol, hydroxyl number approximately 375, made by Union Carbide Company.

Polyol P220: 6000 molecular weight poly(oxypropylene) triol.

HDM 361: Sucrose based poly(oxypropylene) polyol with hydroxyl number approximately 360. Made by Union Carbide Company.

Mondur MR: Polymethylene polyphenyl isocyanate from Mobay Chemical Co.

LPO Oil: A light high purity aromatic oil, sold by Witco Chemical Co.

Quadraol: N,N,N',N'-tetrakis(2-hydroxypropyl)ethylene diamine accelerator from BASF Wyandotte Co.

Fyrol CEF: Tris(beta chloroethyl) phosphate, fire retardant, from Stauffer Chemical Co.

DABCO: Triethylene diamine, a urethane catalyst, from Air Products Co.

| | |
|---|---|
| Quadrol + Water | These combinations accelerate the cure and are believed to impart added toughness and foam rise to the cured resin, when applied to the surface of the resin before curing. |
| DABCO + Water | |

DABCO TAC: A hydroxylated quaternary ammonium carbonate described in U.S. Pat. No. 4,040,992, made by Air Products Company. This is a so-called delayed action catalyst which becomes operative at elevated temperature.

L-5340: A non-hydrolyzable silicone surfactant described in U.S. Pat. No. 2,834,748 and 2,917,480, made by Union Carbide.

| | |
|---|---|
| LK-211 | All organic surfactant polyols described in U.S. Pat. No. 3,746,663, made by Air Products Co, Allentown, PA. |
| LK-443 | |

Each of the following provides fifty-five U.S. gallons of formulation:

| Formulation | 306D | 340C |
|---|---|---|
| GP700 | 75.6 lbs | 59.7 lbs |
| BE 375 | — | 3.7 |
| Mondur MR | 329.0 | 325.1 |
| Fyrol CEF | 45.4 | 59.7 |
| Quadrol | — | 1.8 |
| Benzoyl chloride | 0.4 (200 ml) | 0.4 (200 ml) |

| Formulation | 334C | 334D |
|---|---|---|
| BE 375 | — | 47.2 lbs |
| HDM 361 | 47.6 lbs | — |
| Mondur MR | 326.2 | 327.3 |
| Fyrol CEF | 28.6 | 28.3 |
| LPO Oil | 47.6 | 47.2 |
| Benzoyl chloride | 0.4 (200 ml) | 0.4 (200 ml) |

Preferred Formulation 340C(MC)

Formulation 340C is itself a preferred formulation. An expecially preferred formulation is obtained by diluting 340C with methylene chloride, which diluted formulation is designated 340C(MC).

In the following description "part" was a soft open cell polyurethane foam in the form of a flat sheet about one inch thick. The part was brush coated on three surfaces, leaving a one inch surface free of the coating (some formulation flowed a few tenths of an inch onto the 4th surface). The cured rigid article showed a foamed hard resin coating about ¼ inch thick on three sides. The resin free surface permits some compression of the soft foam filler when pressure is applied to a extended coated surface.

The following formulation is for a 16 Kg (5 U.S. gallons) batch.

| Formulation | 340C(MC)-16Kg |
|---|---|
| GP700 | 1697.6 g |
| BE 375 | 105.6 |
| Mondur MR | 9248.0 |
| Fyrol CEF | 1697.6 |
| Benzoyl chloride | (8 ml) |
| Methylene chloride | 3.785 l (1 U.S. gallon) |

Procedure
 Weigh Mondur MR into a 5 gallon pail.
 Add benzoyl chloride and mix well.
 In a separate container, weigh out the GP 700, the BE 375, Quadrol and Fyrol CEF. Mix well (A 5 quart paper disposable paint tub works well.)
 While stirring the Mondur MR-benzoyl chloride rapidly, add the GP700 mixture as fast as possible. Scrape the side and bottom of the paint tub to transfer all of the mixture into the Mondur MR pail.
 Stir until uniform, blanket with nitrogen and cover.
 Next day, add one gallon of methylene chloride, mixing well.
 Clean part to be coated, removing grease and mold release material. Brush on a small amount of methylene chloride and allow to dry.
 Apply the hard resin mixture to three surfaces of the part, using a disposable paint brush. Work the hard resin mixture into the part until the surfaces become dark brown. Try to distribute the mixture evenly on the surface.
 The coated part hardens in 24–72 hours at room temperature.
 [Suggestion] Practice on scrap material first.

2. Soft Polyurethane Resin Formulation

A preferred soft polyurethane resin formulation for use as an adhesive in forming a vinyl polymer covered rigid article is:

| Formulation | 185KTS (55 gal) |
|---|---|
| Polyol P220 | 142.0 lbs |
| Fyrol CEF | 42.6 |
| Mondur MR | 123.4 |
| LPO Oil | 142.0 |
| Benzoyl chloride | 0.4 (200 ml) |
| Dibutyl tin dilaurate (catalyst) | (about 0.45 ml) |

ALTERNATE PROCEDURES

When a more controlled cure, with some acceleration, is desired for the hard resin formulation, for example, 306D, 340C, 334C, 334D, and 340C(MC), water is used in connection with production of the various embodiments. To illustrate: in FIGS. 2, 4 and 5, water, catalysts, and other cure conditioners may be applied to the surfaces which are coated with resin, before the article undergoes cure. This procedure has the disadvantage that the catalyst and cure conditioners do not penetrate completely or uniformly throughout the layer of resin, and as a result, the resin may not have a substantially homogeneous cured condition. As the viscosity of the resin formulation increases, the "homogeneous cure" difficulty becomes more acute.

When a viscous resin is to be used in the invention, an improved "catalyst and cure conditioner" introduction procedure can be utilized. In the improved procedure, a catalyst is selected which does not begin to accelerate the cure at the temperature of processing the article prior to the cure temperature. To illustrate: Catalyst, such as DABCO TAC and surfactants, such as L-5340 and LK-211 and/or LK-443 are used. The delayed action catalyst and conditioners are blended into the resin formulation to obtain a substantially uniform condition prior to the formulation being introduced into the application step of the procedure, for example as shown in FIGS. 2 and 4. After the blend has been applied, a layer of water is then applied to the resin coating, for example in FIG. 3 coating 16 and/or coating 32; and correspondingly the resin coating(s) of FIG. 4.

It has been observed that when water has been applied to a resin-catalyst formulation, the resin is cured homogeneously at a temperature sufficient to activate the delayed action catalyst. It is believed that the steam generated from the water penetrates throughout the body of the resin formulation to provide a cured homogeneous resin member.

The process of the "water applied to the surface of resin-catalyst formulation" and the cured article are described in detail and claimed in an earlier filed co-pending application of this applicant, entitled "Catalyst Initiated Prepolymer Adhesive Systems" Ser. No. 200,199, filed Oct. 24, 1980.

Thus having described the invention what is claimed is:

1. A laminate article comprising:
   a soft foam member;
   integrally adhered to at least one surface of said soft foam member, a hard polyurethane resin member formed by the curing of a hard resin affording material;
   said integral adhesion being obtained by way of penetration of said hard resin affording material into cells of said soft foam member, while coating said soft foam member, for a distance sufficient to provide a substantially permanent bond between said two members, after curing said hard resin affording material; and
   said hard resin member sufficiently thick to provide configurational support of predetermined rigidity for said article.

2. The article of claim 1 including a cover member adhered to at least one free surface of said soft foam member.

3. The article of claim 2 where said cover member comprises a plastic or a textile fabric.

4. The article of claim 1 including a soft polyurethane resin adhesive layer positioned on at least one free surface of said soft foam member.

5. The article of claim 4 including a cover member adhered by said soft resin.

6. The article of claim 1 including
   a barrier layer member adherently positioned on at least one free surface of said soft foam member, said barrier layer preventing deep penetration of said hard polyurethane resin into said soft foam member; and
   a second soft foam member adherently positioned on said free barrier layer surface.

7. The article of claim 6 including a cover member adhered to a free surface of said second soft foam member.

8. The article of claim 7 where said cover member comprises a plastic or a textile fabric.

9. The article of claim 6 including a soft polyurethane resin adhesive layer positioned on at least one free surface of said second soft foam member.

10. The article of claim 9 including a cover member adhered by said soft resin.

11. A laminate article comprising
a soft foam member;
a barrier layer member adherently positioned on at least one free surface of said foam member; and
adherently positioned on a free surface of said barrier layer member, a hard polyurethane resin member sufficiently thick to provide a configurational support of predetermined rigidity for said article;
said barrier layer preventing deep penetration of said hard polyurethane resin into said soft foam member.

12. The article of claim 11 including a cover member adhered to at least one free surface of said soft foam member.

13. The article of claim 12 wherein said cover member comprises a plastic or a textile fabric.

* * * * *